US011295029B1

(12) United States Patent
Greenblatt et al.

(10) Patent No.: US 11,295,029 B1
(45) Date of Patent: Apr. 5, 2022

(54) COMPUTER FILE SECURITY USING EXTENDED METADATA

(71) Applicant: Aaron B. Greenblatt, Redwood City, CA (US)

(72) Inventors: Aaron B. Greenblatt, Redwood City, CA (US); Adrián Yanes Martinez, Santa Barbara, CA (US); Andrew Obler, Clovis, CA (US); Daniel P. Christl, Phoenix, AZ (US); Ryan Kim, Fairfax, VA (US); Nithya Arun, Nashua, NH (US); Praneet Nadella, Nashua, NH (US); Sahil Mahendrakar, Nashua, NH (US); Abhigya Wangoo, San Ramon, CA (US)

(73) Assignee: Aaron B. Greenblatt, Redwood City, CA (US)

( * ) Notice: Subject to any disclaimer, the term of this patent is extended or adjusted under 35 U.S.C. 154(b) by 98 days.

(21) Appl. No.: 16/933,796

(22) Filed: Jul. 20, 2020

Related U.S. Application Data

(60) Provisional application No. 62/876,873, filed on Jul. 22, 2019.

(51) Int. Cl.
*H04L 29/06* (2006.01)
*G06F 21/62* (2013.01)
(Continued)

(52) U.S. Cl.
CPC ........ *G06F 21/6209* (2013.01); *G06F 21/602* (2013.01); *H04L 9/0894* (2013.01);
(Continued)

(58) Field of Classification Search
None
See application file for complete search history.

(56) References Cited

U.S. PATENT DOCUMENTS

| | | | |
|---|---|---|---|
| 2003/0009672 A1* | 1/2003 | Goodman | G06F 21/10 713/176 |
| 2003/0221124 A1* | 11/2003 | Curran | H04L 63/10 707/999.009 |

(Continued)

OTHER PUBLICATIONS

Alvarez et al., "Using Extended File Information (EXIF) File Headers in Digital Evidence Analysis", International Journal of Digital Evidence, Winter 2004, vol. 2, Issue 3, Available Online at https://www.utica.edu/academic/institutes/ecii/publications/articles/A0B1F944-FF4E-4788-E75541A7418DAE24.pdf, Jan. 2004, 5 pages.

(Continued)

*Primary Examiner* — William J. Goodchild
(74) *Attorney, Agent, or Firm* — Kilpatrick Townsend & Stockton LLP

(57) ABSTRACT

A method of securing electronic computer files includes having a client-based application running in the background with a kernel extension and a communication channel over a network to a server. The client app. can intercept an interprocess communication for opening a file and then collect a swath of fingerprint information about the requesting process and the state of the computer. The fingerprint information is sent to the server, optionally through a Signal Protocol message hidden by steganography in an image. Based on the fingerprint information, the server sends a key and/or a command back, optionally through steganography, to the client. The file is then accessed and decrypted—or accessed and not decrypted—based on the server key and command. The command can include instructions to gather more data from the user or about the computer before allowing access.

21 Claims, 10 Drawing Sheets

(51) Int. Cl.
*G06F 21/60* (2013.01)
*H04L 9/14* (2006.01)
*H04L 9/08* (2006.01)
*H04L 9/32* (2006.01)

(52) U.S. Cl.
CPC .............. *H04L 9/14* (2013.01); *H04L 9/3236* (2013.01); *H04L 63/0428* (2013.01); *G06F 2221/2107* (2013.01)

(56) References Cited

U.S. PATENT DOCUMENTS

| | | | |
|---|---|---|---|
| 2006/0074940 A1* | 4/2006 | Craft ..................... | G06F 16/182 |
| 2007/0011136 A1* | 1/2007 | Haskin .................... | G06F 21/41 |
| 2012/0204028 A1* | 8/2012 | Banerjee ................ | H04L 63/20 |
| | | | 380/279 |
| 2014/0188790 A1* | 7/2014 | Hunter ................... | G06F 16/955 |
| | | | 707/610 |
| 2015/0295941 A1* | 10/2015 | Lim .................... | H04L 63/0457 |
| | | | 713/165 |

OTHER PUBLICATIONS

Application No. PCT/US2020/042817, International Search Report and Written Opinion, dated Oct. 4, 2020, 13 pages.

\* cited by examiner

COMPUTER FILE SECURITY USING EXTENDED METADATA

CROSS-REFERENCES TO RELATED APPLICATIONS

The present application claims the benefit of U.S. Provisional Patent Application No. 62/876,873, filed Jul. 22, 2019, which is hereby incorporated by reference in its entirety for all purposes.

STATEMENT AS TO RIGHTS TO INVENTIONS MADE UNDER FEDERALLY SPONSORED RESEARCH AND DEVELOPMENT

This invention was made with government support under Grant No. FA8730-20-C-0025 awarded by the United States Air Force. The government has certain rights in the invention.

BACKGROUND

Securing electronic files on computer systems includes encryption techniques and user-profile linked access permissions. Encrypted electronic files may be secured against some unauthorized access requests, but may be left vulnerable to being compromised by unsecured access by an authorized user, such as phishing attacks, user-initiated requests to open files in unauthorized applications, or requests to access encrypted files in unsecure locations. Data loss prevention techniques are limited in their efficacy when addressing such issues, which may risk unauthorized release of secure electronic files, with potentially severe consequences for national security, intellectual property, valuable proprietary information, and private information, such as identifiable personal health data.

There is a need in the art for better protection of documents against cyberintrusions or unauthorized access.

BRIEF SUMMARY

The present application relates generally to securing electronic files on digital systems, including data loss prevention techniques involving encryption and request auditing. Specifically, the application relates to intercepting user-generated file access requests addressed to encrypted files on a computer system, gathering user, system, and process information associated with the computer system, spiriting away the information to a remote server that determines whether to decrypt or to inhibit decryption of the encrypted file based on the gathered information, and then sending back an appropriate command.

In a first aspect, a method of securing electronic files includes intercepting, within a computer system, a file access request for an encrypted electronic file having a filename, looking up a globally unique file identifier associated with the file, gathering, from within the computer system, information about the computer system, the information including a name of a process that sent the file access request and a username running the process, packaging the globally unique file identifier along with the information into a message, sending the message from the computer system to a server, receiving a payload from the server in response to the sent message, and decrypting, or inhibiting decryption of, the encrypted electronic file based on the payload.

In an example, the method further includes steganographically concealing the message within first image data before the sending and extracting the payload steganographically concealed within second image data received from the server.

In an example, the first image data and the second image data correspond to a single image.

In an example, the packaging of the message includes encrypting using the Signal Protocol.

In an example, the payload includes a decryption key.

In an example, the payload includes a command from the server.

In an example, the method further includes gathering additional information about the computer system per the command, packaging the additional information into an exfiltration message, and sending the exfiltration message from the computer system to the server.

In an example, the method further includes prompting a user of the computer system for additional information per the command, packaging a response to the user prompt into an additional message, sending the additional message from the computer system to the server, and receiving a second payload from the server in response to the sent additional message.

In an example, the method further includes providing, per the command, a different file from that requested by the file access request.

In an example, the method further includes attaching malware to the encrypted electronic file per the command.

In an example, the method further includes deleting the encrypted electronic file per the command.

In an example, inhibiting of decryption includes bypassing a decryption routine, providing an incorrect decryption key to the decryption routine, or canceling the decryption routine.

In an example, the information about the computer system further includes a process identifier (PID) of the process, a name of an application associated with the process a path of an executable associated with the process, an uptime of the process, a central processing unit (CPU) usage of the process, a memory usage by the process, and/or a hash of the executable associated with the process.

In an example, the method further includes the information about the computer system further includes a shell type running the process, a time logged in of the username, whether the username is logged in locally or remote, whether there exists a printer redirection for the username, whether there exists a clipboard redirection for the username, a group membership of the username, sudo permissions for the username, a user database associated with the username, and/or a password hash associated with the username.

In an example, the information about the computer system further includes an internet protocol (IP) address, a serial number, a media access control (MAC) address, a trusted platform module (TPM) key, an operating system (OS) version, a time zone setting, a local language setting, a list of hardware drivers connected with the computer system, a list of software versions, a list of installed software, a list of networks connected, a link-layer protocol, and/or a link-layer detail.

In an example, the method further includes receiving, before the intercepting, an email with the encrypted electronic file from a second computer system in which decryption of the encrypted electronic file was previously inhibited at the second computer system.

In an example, the method further includes attaching, after the inhibiting of decryption, the encrypted electronic file to an email, and sending the email from the computer system to a second computer system, wherein an encryption key is successfully provided to the second computer system from the server based on a second message with the globally unique file identifier along with a name of a process and a username from the second computer system.

In an example, the intercepting is performed by a kernel extension, a system extension, or a usermode process.

In an example, the file access request includes an open request, a read request, a write request, or a permission change request.

In a second aspect, a machine-readable non-transitory medium embodies information for securing electronic files, the information indicative of instructions for causing one or more machines to perform operations including the method of the first aspect and any number of the examples of the first aspect, alone or in combination.

In a third aspect, a computer executing program code for securing electronic files includes a memory and at least one processor operatively coupled with the memory and executing program code from the memory comprising instructions for the method of the first aspect and any number of the examples of the first aspect, alone or in combination.

In a fourth aspect, a method of securing electronic files from a server includes receiving, at a server, a message from a computer system that experienced a file access request for an encrypted electronic file, extracting information about the computer system from the message, the information including a name of a process that sent the file access request and username running the process, determining, at the server, whether the file access request is authorized, conditionally authorized, or not authorized based on the information, packaging a command and/or a decryption key into a payload based on the determining, and sending the payload from the server to the computer system.

In an example, the method further includes extracting the message steganographically concealed within first image data and steganographically concealing the payload within second image data before the sending.

In an example, the first image data and the second image data correspond to a single image.

In an example, the packaging into the payload includes encrypting using the Signal Protocol.

In an example, the command includes gathering additional information about the computer system, and the method further includes receiving an exfiltration message with the additional information from the computer system.

In an example, the command includes prompting a user of the computer system for additional information, and the method further includes receiving a response to the user prompt from the computer system, assessing the response, and sending a second payload from the server to the computer system based on the assessing.

In an example, the command includes providing a different file from that requested by the file access request.

In an example, the command includes attaching malware to the encrypted electronic file.

In an example, the command includes deleting the encrypted electronic file.

In an example, the determining includes classifying the file access request based on categorizing the information about the computer system in a model, the model having been trained through supervised or unsupervised machine learning.

In an example, the determining includes classifying the file access request based on a lookup table.

In an example, the file access request is classified as authorized based on whether the process belongs to a native application for a file type of the encrypted electronic file.

In an example, he file access request is classified as conditionally authorized based on whether the process belongs to an email application, a networking file transfer application, or an operating system (OS) command for file transferring through a network.

In an example, the lookup table includes a whitelist or blacklist of IP addresses, a whitelist or blacklist of IP address domains, a whitelist or blacklist of processes, a whitelist or blacklist of time zones or local language settings, and/or a whitelist of blacklist of hardware drivers.

In a fifth aspect, a machine-readable non-transitory medium embodies information for securing electronic files from a server, the information indicative of instructions for causing one or more machines to perform operations including the method of the fourth aspect and any number of the examples of the fourth aspect, alone or in combination.

In a sixth aspect, a computer executing program code for securing electronic files from a server includes a memory and at least one processor operatively coupled with the memory and executing program code from the memory comprising instructions for the method of the fourth aspect and any number of the examples of the fourth aspect, alone or in combination.

DETAILED DESCRIPTION

Figure 1:
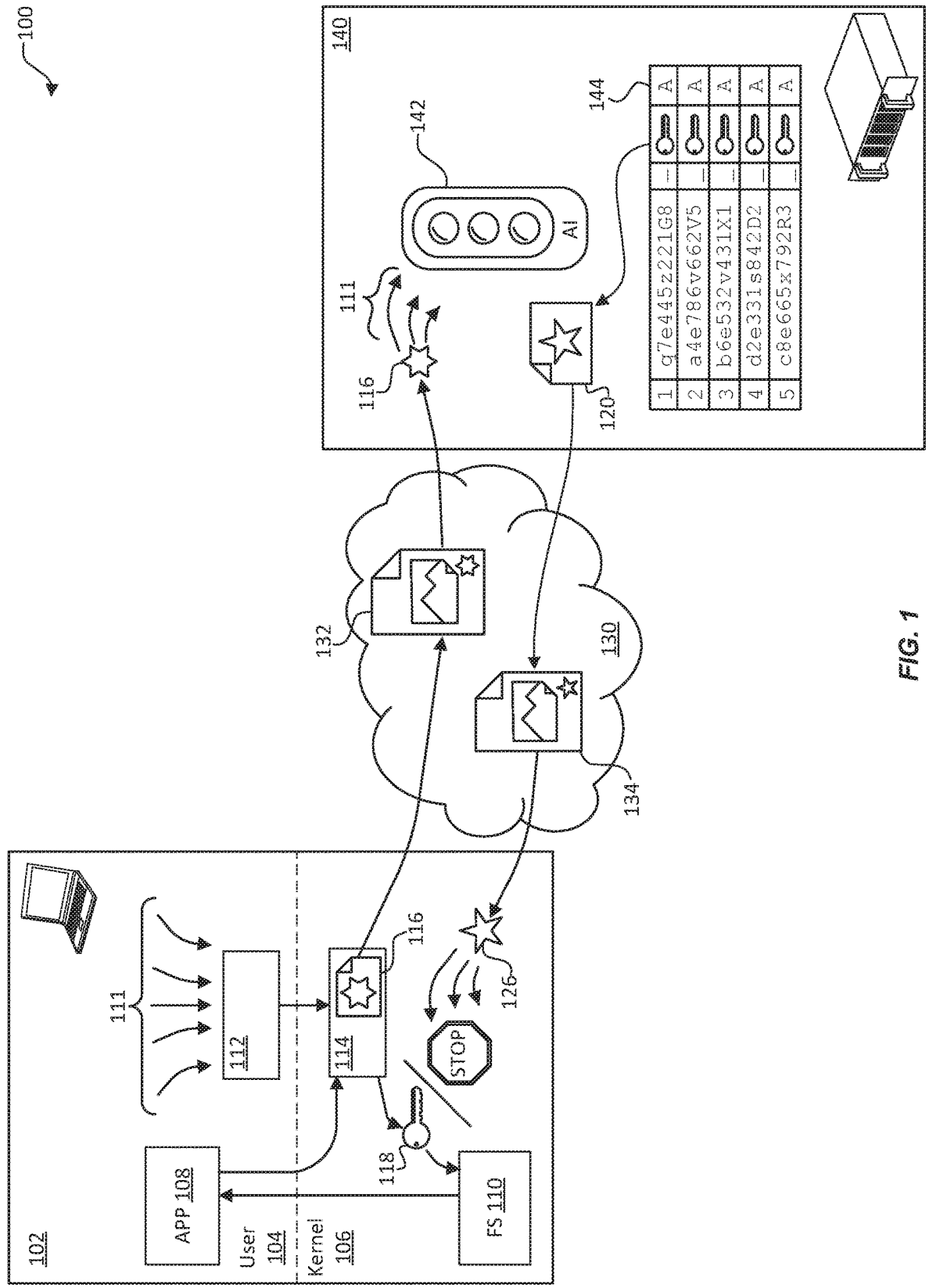
FIG. 1 illustrates an example technique for securing electronic files, according to an embodiment of the present disclosure.

Generally, systems and methods for improved data loss prevention techniques and for securing electronic files are described. In an example, a client-based application may run as a background process on a computer system with a kernel extension and can communicate over a network to a server. The client-based application can intercept a file access request for opening a file and then gather fingerprint information about the requesting process and the state of the computer. The fingerprint information can be sent to the server, optionally through a secure (e.g., Signal Protocol) message concealed by steganography in an image. Based on the fingerprint information, the server can make a determination about whether to grant access by authorizing decryption of the file, thereby sending a key and/or a command back to the computer system, optionally through steganography. The file can then be accessed and decrypted using a decryption key provided by the server. While a file access request is described, the data loss prevention techniques also apply to CRUD operations in general (e.g., creation, insertion, retrieval, query, search, read or find, update, edit, deletion, removal, etc.).

In an illustrative example, a user of a client device makes a request to access an encrypted file stored on the client device. Being authorized to view the encrypted file, the user may not discern any intermediary processes between his request to access the encrypted file and the operating system of the client device launching the native application associated with the encrypted file. The user gains access to the file without explicit indication that the file access request was intercepted and reviewed.

Through a series of background processes, invisible to the user, a client-based application for securing electronic files has intercepted the access request and prevented the native application from contacting the file system of the client device. The client-based application has looked up the unique identifier of the encrypted file, gathered information about the user and the device, and created an encrypted message, which it then has sent to a server configured to process the information and determine an outcome of the request. The server has processed the information, determined that the access request was made by an authorized user with access privilege, that the client device was connected on a secure network, and that information gathered by the client-based application did not indicate a risk of data loss. The server has then created a payload including a command and a decryption key, which the server has encrypted and sent back to the client device. The client device has decrypted the payload received from the server, extracted the command to decrypt the file, and executed the command using the decryption key, granting access to the encrypted file in completion of the access request. The sequence of processes, from interception to execution, has occurred without visual indication to the user, and communication between the client device and the server has been concealed by steganography, such that the encrypted messages may not be immediately discernable to outside observers of network traffic. In some embodiments, the operations implemented by the server may, additionally and/or alternatively, be implemented by the client device. For example, as when the client device is unable to communicate with the server, the client device may be configured to process the information and determine an outcome of the request without sending the encrypted message and/or receiving the payload. For example, the client device may be configured to implement a local decision engine to process the information and determine an outcome of the access request.

Embodiments of the present disclosure provide several advantages over existing systems and methods for securing electronic files. For example, file access requests generated by a user of the client device may be intercepted by processes that are not visible to the user. Similarly, file access control processes (e.g., gathering information about the user and the device, sending encrypted messages to a server for disposal of the file access request, receiving commands from the server, etc.) may occur invisibly to the user. In both cases, reduced visibility of file control processes may reduce the risk of circumvention efforts and may reduce the perceived profile of a client-based application securing electronic files. Furthermore, file access requests may be processed with potentially reduced latency, afforded, for example, by symmetric encryption. Improved communication security may be provided by steganographic concealment of encrypted messages between the client device and the server, which may further improve message security provided by encryption, for example, using the Signal Protocol. Multi-factor verification may provide additional security when accessing encrypted electronic files, for example, by using hardware authentication devices (e.g., a "YubiKey") to provide one-time use access keys at the time of an access request. Furthermore, containment and tracing of unauthorized data release may be improved by one or more techniques, such as data exfiltration, auditing text editing operations, logging encryption keys in association with files, and tracking file contents from files subject to unauthorized requests by forwarding files to authorized client devices and/or attaching malware to files. In addition, adaptive techniques may improve responsiveness of access request determination, for example, by introducing learning models configured to determine, from gathered information, whether an access request should be granted. Finally, protection of secure files may be further improved by additional and/or alternative outcomes implemented by the client device, including deleting the secure file (e.g., to prevent release), invisibly emailing the file to a second system, and/or providing a different file to the file requested (e.g., to provide a visible indication that the request has been denied).

FIG. 1 illustrates an example technique 100 for securing electronic files, according to an embodiment of the present disclosure. The example technique 100 may permit a computer system 102 to intercept file access requests addressed at encrypted files and to implement one or more operations to manage user access and replication privileges. In some embodiments, the example technique 100 may implement additional and/or alternative techniques to encrypt, conceal, and/or identify users, systems, and/or commands associated with the file access request. As described above, the example technique 100 may improve security of electronic file contents by identifying users and/or systems, and inhibiting decryption of encrypted electronic files when appropriate.

The computer system 102 may include a user mode 104 and a kernel mode 106. For example, the user mode 104 may describe a level of access privileges associated with applications for which access to system process and hardware is limited by the operating system of the computer system 102. By contrast, kernel mode 106 may describe an execution mode which enables execution of all instructions, including privileged instructions. It may also give access to a different address space (e.g., to memory management hardware, and to other peripherals). In some embodiments, kernel mode 106 may describe the mode in which the operating system of the computer system 102 also runs. In some embodiments, as in microcontroller unit (MCU) systems, operations described as running in user mode 104 or kernel mode 106 may instead be implemented by elements of embedded systems configured to execute applications.

In some embodiments, the computer system 102 (e.g., a user device such as a laptop, personal computer, mobile electronic device, etc.) may include a client-based application 108, configured to implement the example technique 100. The client-based application 108 may run in the background of the computer system 102 (e.g., not generating and/or presenting a visual indication of the application execution, as in a graphical user interface, or "GUI"). The client-based application 108 may run in user mode 104, while implementing one or more operations in kernel mode 106. Operations in kernel mode 106 may be enabled via system calls (e.g., a kernel extension, a system extension, etc.) that may permit the client-based application 108 to implement kernel mode 106 processes, as described below.

In some embodiments, a system call describes a programmatic operation by which a computer application requests a service from the kernel of the operating system on which it is executed. System calls may permit the computer application to access or modify other running programs or the operating system itself, and/or directly manipulating hardware devices (e.g. a frame buffer or network devices). System calls may include processes from several categories including, but not limited to, process controls, file management processes (e.g., create, delete, open, close, read, write, etc.), device management processes, information maintenance, communication processes (e.g., create/delete communication connection, send/receive messages, attach/detach remote devices, etc.), and file protection processes (e.g., get/set file permissions, etc.).

A user of the computer system 102 may request to access an encrypted file using a different user application on the computer system 102, for example, a process to open and/or edit the file. The request generated by the user may represent an example of an inter-process communication, which may include, but is not limited to, commands to processes to decrypt the file, transfer the file to another location (e.g., to another system such as a server via a network), and/or copy at least a portion of the data included in the file after it has been decrypted. The access request may also include, but is similarly not limited to, an open request, a read request, a write request, and/or a permission change request. As part of securing encrypted files, for example, from unauthorized replication and/or transfer (e.g., data loss prevention), the client-based application 108 may intercept the inter-process communication prior to implementing the request. Intercepting the inter-process communication may be performed via a system call (e.g., a kernel extension, system extension, etc.) in kernel mode 106 and/or via a user mode 104 process. The access request may be intended for a file system (FS) 110 of the computer system 102 and may be intercepted while the client-based application 108 implements security operations, described below.

In some embodiments, the client-based application 108 may identify (e.g., by a lookup operation), a file identifier associated with a filename of the encrypted file. In some cases, the filename may be a globally unique file identifier, by which the encrypted file may be identified, for example, independently of a file-system, operating system, or computer system association. In some embodiments, the client-based application 108 may identify and/or look up the globally unique file identifier by requesting the information from the file system 110.

In some cases, the file system 110 may be a kernel mode 106 process that manages access to both the content of files, and the metadata about those files, stored on one or more storage media (e.g., hard disk drives, SSDs, magnetic tapes, optical discs, etc.) accessed by the computer system 102. The metadata about files managed by the file system 110 may include filenames, location information (e.g., the location of the file in memory and in a file directory), and length of the contents of the file (e.g., file size). In some embodiments, the file system 110 may be a virtual file system, or "VFS," that can allow the client-based application 108 to access multiple different types of file systems (e.g., the file system 110, a networked file system, etc.) in a uniform way. A VFS can, for example, be used to access local and network storage devices transparently without the client application noticing the difference.

Additionally and/or alternatively, the client-based application 108 may gather information 111 about the computer system 102. For example, the client-based application 108 may gather the information 111 from within the computer system 102 (e.g., system parameters, operational information, access and identity information, etc.) using a user mode process 112. The information 111 may include, but is not limited to, a name of a process that sent the access request for the encrypted file and a username corresponding to an account within which the user is running the process. The gathered information may be sent from the user mode process 112 of the client-based application 108, and may be processed by one or more kernel mode processes, described in more detail below.

In some embodiments, the information 111 may also include process information that may include, but is not limited to, a process identifier (PID) of the process, a name of an application associated with the process, a path of an executable associated with the process, an uptime of the process, a central processing unit (CPU) usage of the process, a memory usage by the process, and/or a hash of the executable associated with the process. The process information may permit fingerprinting the system based on the combination of the information 111 to develop a unique system identifier describing the computer system 102.

In some embodiments, the information 111 may also include user information that may include, but is similarly not limited to, a shell type running the process, a time logged in of the username, whether the username is logged in locally or remotely, whether there exists a printer redirection for the username, whether there exists a clipboard redirection for the username, a group membership of the username, sudo permissions for the username (e.g., a "super user" permission describing whether the username is permitted to execute tasks at an elevated permission level, for example, in kernel mode), a user database associated with the username, and/or a password hash associated with the username. The user information may permit fingerprinting the system based on the combination of the information 111 to develop a unique system identifier describing the computer system 102. The user information, and the process information may be included in the information 111 and, as such, the fingerprinting may include both types of information.

In some embodiments, the information 111 may also include system information that may include, but is similarly not limited to, an internet protocol (IP) address, a serial number, a media access control (MAC) address, a trusted platform module (TPM) key, an operating system (OS) version, a time zone setting, a local language setting, a list of hardware drivers connected with the computer system, a list of software versions, a list of installed software, a list of networks connected, a link-layer protocol, and/or a link-layer detail. The system information may permit fingerprinting the system based on the combination of the information 111 to develop a unique system identifier describing the computer system 102. The system information, the user information, and the process information may be included in the information 111 and, as such, the fingerprinting may include examples of all three types of information.

In some embodiments, the client-based application 108 may generate a message including the globally unique file identifier by a kernel mode process 106. Generating the message may include packaging the globally unique file identifier with the gathered information 111 into a single message comprising both types of information. The message may be encrypted in one or more ways, generating an encrypted message 116. In some embodiments, the message may be encrypted using the Signal Protocol (e.g., an encryption protocol combining the Double Ratchet algorithm, prekeys, and a triple Elliptic-curve Diffie-Hellman (3-DH) handshake, developed by Open Whisper Systems, that was formerly known as the TextSecure Protocol) that can be used to provide end-to-end encryption for message transmission over a public network (e.g., the internet). Encryption may be implemented using a symmetric encryption algorithm, whereby the message is encrypted and decrypted using the same encryption key 118. In such cases, the encryption key 118 may be used to decrypt the requested file, for example, when the access request is granted, as described in more detail, below.

Encryption may also include public/private key encryption (e.g, asymmetric encryption), "sealed sender" metadata reduction features (e.g., by encrypting the identifier of the computer system 102), provision for authentication techniques including, but not limited to, public key fingerprinting and/or "trust-on-first-use" mechanisms. In some embodiments, a public key of a public/private key pair used to encrypt the message may be used to decrypt the file. The public key may permit the client-based application 108 to later decrypt the encrypted message 116, as described below.

In some embodiments, the encrypted message 116 may be transferred and/or sent over a network 130 (e.g., the internet, a private network, a local network, etc.) to a recipient system. In some cases, the recipient system is a server 140, which may include, but is not limited to, an external server of a security system, a local server implementing one or more electronic file security applications, etc. For example, when the computer system 102 is running on a client server, the server 140 may run on the same physical computer as the computer system 102, in the same physical location. In another example, the computer system 102 and the server 140 may be separate physical computers, running in different physical locations.

In some embodiments, the encrypted message 116 may be concealed by incorporation into a first image file 132, for additional security while being transferred over the network 130. The first image file 132 may include first image data (e.g., data encoding the image as a combination of color and intensity values). In some embodiments, concealing the encrypted message 116 may include one or more steganographic techniques, such that an external observer of communication between the computer system 102 and the server 140 may observe the transmission of the first image file 132, without being aware of the encrypted message 116 encoded in the first image data.

In some embodiments, steganography describes visual encryption techniques whereby the data contained in the encrypted message 116 may be encoded as a variation of the first image data encoding the first image file 132. For example, the encrypted message 116 may be encoded as a variation of every hundredth pixel of the first image file 132. The recipient of the steganographically encoded image may recover the encrypted message 116, for example, through comparison with a reference image (e.g., a copy of the first image file 132) and applying one or more transformations to the recovered data, which may include difference values that can be correlated to encoded data. In some embodiments, a simple transformation of the steganographically encoded image (e.g., truncation, selection of least-significant bits of each color component, etc.) may permit recovery of the encrypted message 116, without comparison to a reference image.

In some embodiments, steganography may also be implemented by concealing the encrypted message 116 in an audio file, for example, by modifying frequency spectrum components in a manner that may be indistinguishable to an automated spectral analyzer and/or a human listener. In such cases, recovery of the encrypted message 116 may be facilitated by techniques including, but not limited to, frequency domain transformations (e.g., FFT, filtering, etc.) to isolate the encoded data.

At the server 140, the encrypted message 116 may be received and/or recovered from the first image file 132. As part of one or more further processing operations, the information 111 gathered as part of the message may be recovered from the encrypted message 116. The server 140 may extract information including, but not limited to a name of the process that originated and/or sent the file access request, a username running the process (e.g., a user of the computer system 102), and additional information that may be used to classify the file access request, as described in more detail, below. Appropriate decryption operations may be applied to the encrypted message 116 by the server 140, for example, as when the Signal protocol is used to encrypt the message to generate the encrypted message 116. In cases where symmetric encryption is used, the server 140 may store a copy of the encryption key with which the server 140 may decrypt the encrypted message. In some embodiments, the computer system 102 may provide a copy of the encryption key used to generate the encrypted message 116 to the server 140.

In some embodiments, the server may generate a payload 120 in response to processing the information 111. The payload 120 may include a command dispositive of the access request, as described in more detail below, and may be encrypted before transmission from the server 140 to the computer system 102. The payload 120 can be a message including one or more commands, data, information, or the like. In some embodiments, the payload 120 may be encoded into image data of a second image file 134, via steganographic encryption, as described above. In some embodiments, the second image file 134 is the same image as the first image file 132. In this way, an external observer of message traffic over the network 130 would potentially observe a perceptually identical image being sent repeatedly between the computer system 102 and the server 140.

Once the computer system 102 receives the payload 120, the client-based application 108 may decrypt the payload 120 to recover the payload contents 126. As described above, the payload contents 126 may include a command dispositive of the access request, and may also include a decryption key. Based on the command included in the payload 120, the client-based application 108 may decrypt the encrypted electronic file, or may inhibit decryption of the encrypted electronic file, as described in more detail in reference to the figures, below. Inhibiting decryption of the electronic file may include bypassing a decryption routine, providing an incorrect decryption key to the decryption routine, or canceling the decryption routine.

Figure 4:
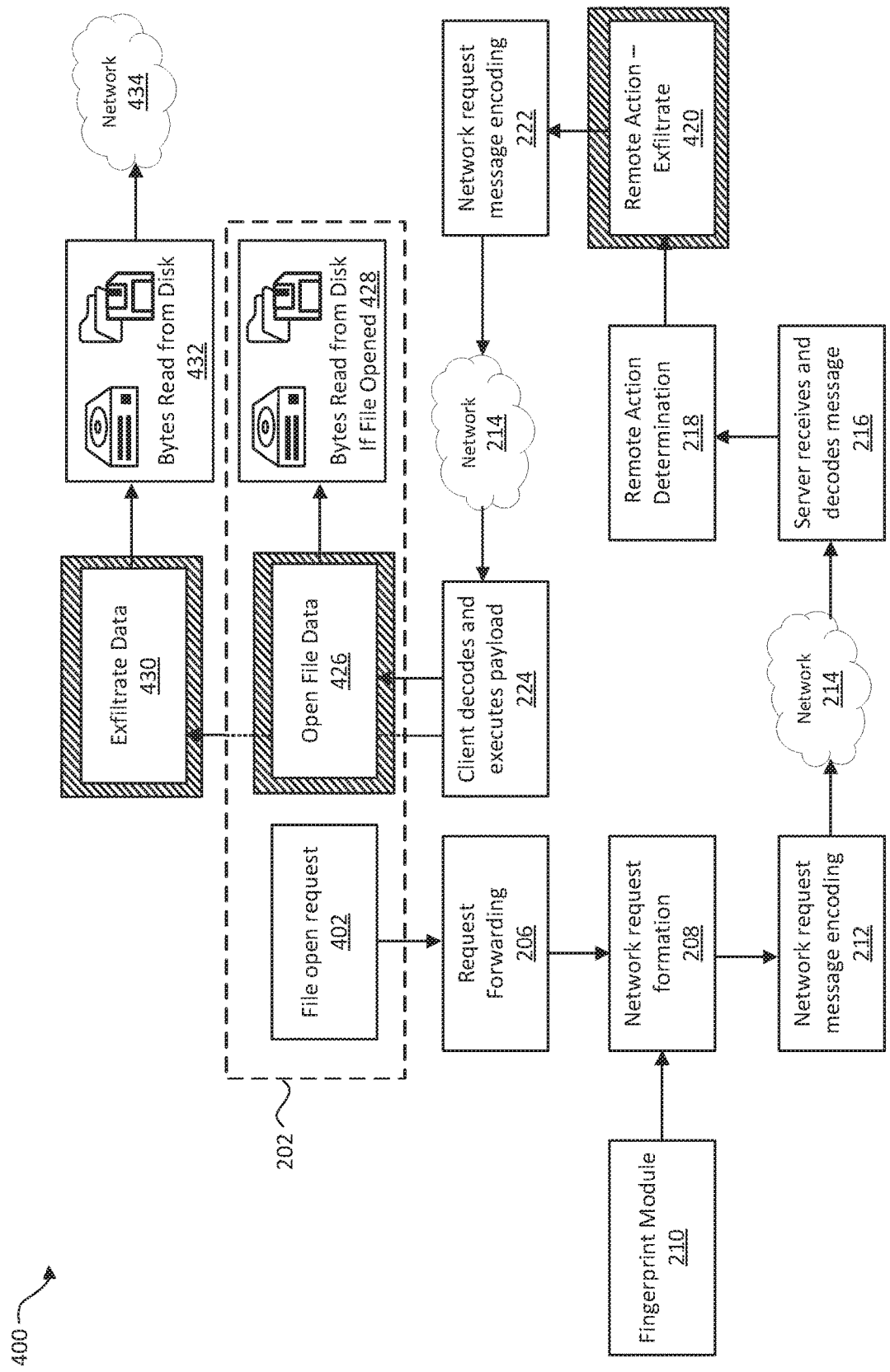
FIG. 4 illustrates an example technique for securely exfiltrating data from a file, according to an embodiment of the present disclosure.

In some embodiments, the payload 120 may also include additional and/or alternative commands for the client-based application 108 to execute kernel mode 106 processes including, but not limited to, gathering additional information about the computer system 102 automatically (e.g., without user interaction), packaging the additional information, and sending an exfiltration message from the computer system 102 to the server 140, as described in more detail in reference to FIG. 4, below. In some embodiments, the payload 120 may also include additional and/or alternative commands for the client-based application 108 to prompt a user of the computer system 102 for additional information, which may be packaged and sent to the server 140 as an additional message from the computer system 102. In some embodiments, the additional message may be processed in a manner similar to the encrypted message 116, such that the additional information is used by the server 140 to generate a second payload, which may be sent back to the computer system 102. As with the payload 120, the second payload may include one or more commands, a decryption key, additional information, etc.

In some embodiments, the command may instruct the client-based application 108 implement one or more alternative operations, in place of decrypting or inhibiting decryption of the encrypted electronic file. In some embodiments, the command may instruct the client-based application 108 to provide a different file from that requested by the file access request (e.g., the encrypted electronic file). The different file may, for example, include an explanation to the user of the computer system 102 that the file is unavailable. In some embodiments, the command may instruct the client-based application 108 to delete the encrypted electronic file (e.g., remove it from the filing system 110).

In some embodiments, the command may instruct the client-based application 108 to attach malware to the encrypted electronic file. The encrypted electronic file may carry the malware to an unauthorized recipient, and may act as a countermeasure to targeting the recipient system. In some embodiments, the client-based application 108 may be loaded onto a client device via the malware (e.g., an agent (or a downloader for the agent) may be embedded into the data file using malware techniques). In some embodiments, the malware may be configured to implement countermeasures targeting data operations including, but not limited to, deploying ransomware, exfiltrating data from the client device, identifying and/or infiltrating supervisory control and data acquisition (SCADA) devices, etc. In some embodiments, the malware may configure the client-based application 108 to collect additional metadata beyond what is necessary to dispose of a file access request. For example, additional metadata may include user interaction data to validate one or more subsequent measures including, but not limited to, usage reports, activity logs, time sheets, etc.

The server may implement one or more processes and/or approaches to determine an action in response to receiving the encrypted message 116. In some embodiments, the server 140 may implement an artificial intelligence (AI) engine 142 configured to determine whether to grant the access request. The AI engine 142 may implement one or more classification approaches including, but not limited a clustering algorithm implemented in an artificial neural network, which may employ unsupervised learning. In some embodiments, the AI engine 142 may classify the information 111 according to one or more features in a feature space, such that the AI engine 142 may define and evaluate a separation function between one or more clusters of requests as determined according to dimensions of the feature space. Such approaches may permit the AI engine 142 to dynamically adjust clustering and/or feature space parameters to optimize classifier accuracy over time, geography, etc. In some embodiments, the AI engine 142 may implement reinforcement learning and/or deep learning features to revise the classification approach, for example, to adapt to changes in request data (e.g., information 111) for a large number of access requests from multiple computer systems (e.g., computer system 102). The AI engine 142 may employ a trained model, having been trained by one or more techniques (e.g., supervised learning, adversarial learning, unsupervised learning, combinations thereof, etc.)

The AI engine 142 may be configured to include one or more procedural and/or rules-based determination techniques (e.g., without AI features) including classifying the file access request based on a lookup table. The lookup table may include blacklisted and/or whitelisted access request features including, but not limited to, the types of information described above (e.g., file types, file locations, destination addresses, transformation operations, user names, device locations, network security parameters, etc.). As another example, the lookup table may include a whitelist or blacklist of IP addresses, a whitelist or blacklist of IP address domains, a whitelist or blacklist of processes, a whitelist or blacklist of time zones or local language settings, and/or a whitelist of blacklist of hardware drivers.

The type of application originating the file access request may also be included as a feature for classification. In such cases, the file access request may be authorized when the application is a native application for a file type of the encrypted electronic file. For example, if the encrypted electronic file is a document file (e.g., ".docx"), and the file access request is originated by the native document editing application associated the document file, the server 140 may procedurally authorize the file access request. In some embodiments, the server 140 may conditionally authorize the file access request based on whether the file access request is originated by a trusted and/or authorized application or process (e.g., an email application, a networking file transfer application, an operating system (OS) command for file transferring through a network, etc.).

The server 140 may include a data table 144 storing multiple keys including, but not limited to, one or more payload and/or file encryption keys that may be used to encrypt the payload 120 or the encrypted electronic file (e.g., encryption key 118). The payload encryption key may be configured for single-use, such that the server 140 may remove the payload encryption key from the table 144 after it has been used to encrypt the payload 120. As described above, the payload encryption key may be included in the payload 120, for example, when the payload 120 is encrypted by symmetric encryption, such that the computer system 102 may receive the payload encryption key along with other payload contents 126 (e.g., the command, malware, request for information from the system and/or the user, etc.).

In some embodiments, before intercepting the file access request, the client-based application 108 may receive an email (e.g., by a user mode 104 process or a kernel mode 106 process) from a second computer system, different from the computer system 102 and the server 140. The second computer system may run a copy of the client-based application 108, and may also communicate with the server 140 as part of securing electronic files managed by a file system of the second computer system. In some embodiments, the email from the second computer system may include an encrypted electronic file that may have been the subject of a file access request originated by a process of the second computer system. For example, the encrypted electronic file may be an encrypted data file (e.g., a comma-separated values ".csv" file) for which a process of the second computer system (e.g., a data editor application) was denied permission to decrypt and access the constituent data in the encrypted database file. Decryption of the encrypted electronic file may have been inhibited (e.g., through a command received by the second computer system in an encrypted payload), as a result of the server 140 determining to block the file access request. In some embodiments, the email may be encrypted before being sent, and decrypted upon receipt.

Analogously, in some embodiments, the client-based application 108 may initiate one or more processes in response to an access request resulting in a command to inhibit decryption. For example, the client-based application 108 may attach an encrypted electronic file that has been the subject of an access request to an email. The email may be addressed to a second computer system, where the second computer system may run a second copy of the client-based application 108, which may also communicate with the server 140. The second computer system may provide the server 140 with an encrypted message containing information including, but not limited to, the globally unique file identifier, a name of a process originating the access request, and a username from the second computer system (e.g., a user of the second computer system that may differ from the user of the computer system 102). In some embodiments, including a second computer system may permit the encrypted electronic file to be accessed in a secure system, as opposed to a potentially insecure system. The client-based application 108 may address the email to a secure system (e.g., a secure access terminal of a computer system) when, for example, the computer system 102 is connected to an unsecured network (e.g., a public network).

Figure 2:
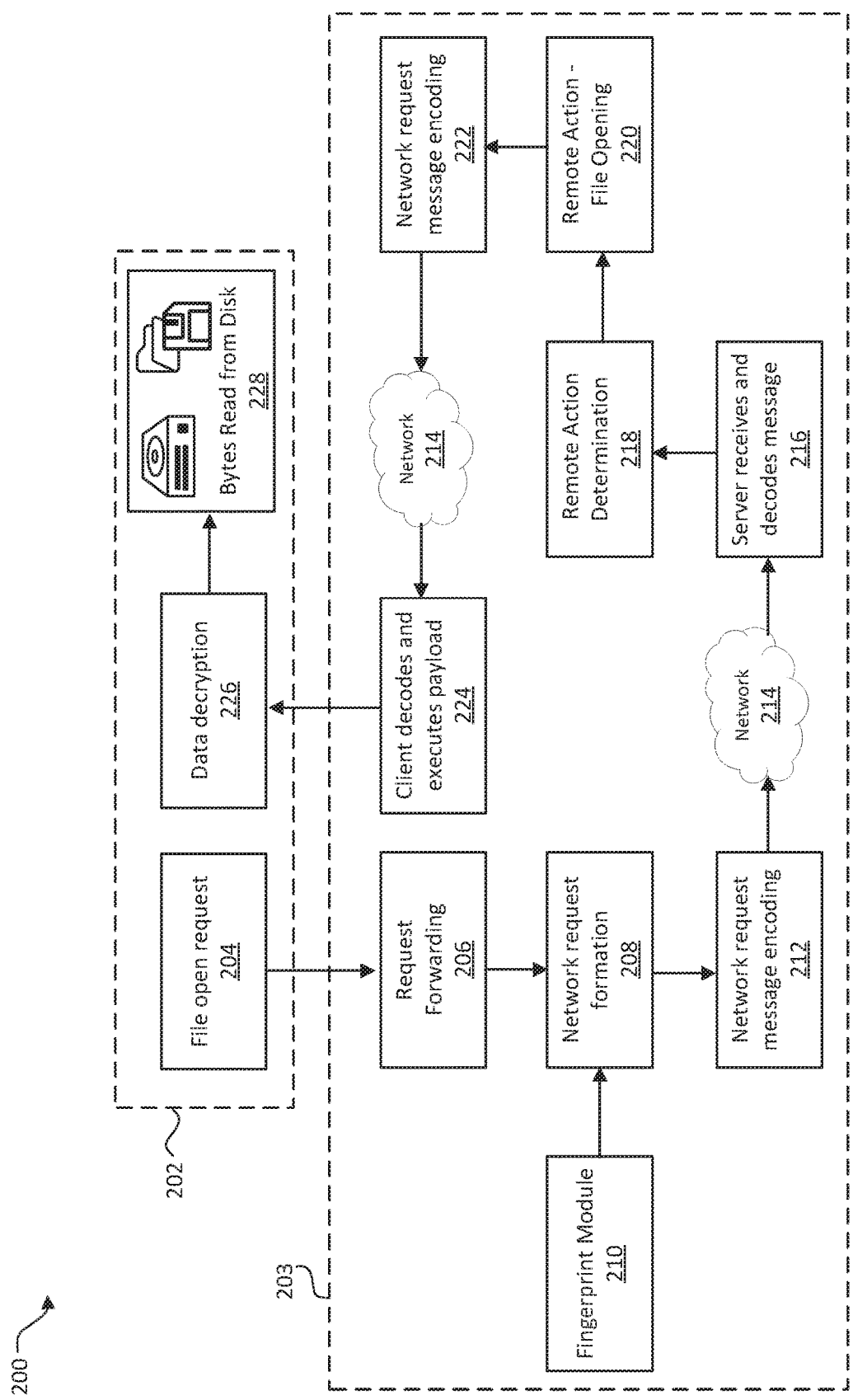
FIG. 2 illustrates an example technique for securely opening a file, according to an embodiment of the present disclosure.

FIG. 2 illustrates an example technique 200 for securely opening a file, according to an embodiment of the present disclosure. The client-based application (e.g., client-based application 108 of FIG. 1) may implement the process flow of example technique 200 to secure encrypted files on a computer system (e.g., computer system 102 of FIG. 1). The example technique 200 may include both user mode processes (e.g., user mode 104 of FIG. 1) and kernel mode processes (e.g., kernel mode 106 of FIG. 1). In some embodiments, one or more processes are visible or otherwise discernable to a user of the computer system (e.g., the user is aware of the processes), while other processes are invisible to the user of the computer system. The visible processes 202 may include user-initiated processes and system-initiated processes that the user is aware of. For example, an application of the computer system may generate a file open request 204 (e.g., an access request to open an encrypted electronic file, as described above) in response to a user action to access an encrypted file. The file open request 204 may be made to the operating system (e.g., to execute a kernel mode process) to access the file via a file system (e.g., file system 110 of FIG. 1). Visible processes 202 may include default or otherwise normal system and application processes, while invisible processes 203 of example technique 200 may include one or more operations by a client application and/or by a server to intercept requests, gather information (also, referred to as "fingerprint" information), analyze the request, determine an action (e.g., decrypt, inhibit decryption, delete, etc.), execute the action, or the like.

In some cases, the file open request 204 may be intercepted by a request forwarding process (e.g., operation 206). The request forwarding may intercept the file open request 204 as part of securing the encrypted file that is subject to the file open request 204. In some embodiments, the file open request 204 may be forwarded to a process of the client-based application (e.g., user mode process 112 of FIG. 1). The client-based application may implement a network request formation process (e.g., operation 208), which may gather file and classifier information that may include one or more examples of information 111 of FIG. 1 (e.g., unique global identifier, user information, process information, system information, username, etc.). The network request formation may receive the classifier information from a fingerprint module 210, which may collect the classifier information from the computer system. The network request formation process may provide the network request information to a network request message encoding process (e.g., operation 212). The network request message encoding process may generate an encrypted message (e.g., encrypted message 116 of FIG. 1) by one or more encoding protocols including, but not limited to, plaintext HTTP (hypertext transfer protocol), javascript object notation hypertext transfer protocol secure (JSON HTTPS), Signal HTTPS (Signal Protocol using HTTPS), Signal combined with steganography HTTP, Blockchain, Distributed Hash Table (DHT), USB memory device, "Pony Express" (an engine providing low-latency communication designed to interact with client applications over a Unix domain socket), as well port communications (e.g., simple network management protocol (SNMP), high-number transmission control protocol (TCP), user datagram protocol (UDP), etc.).

In some embodiments, the network request message encoding process may send the encrypted message over a network 214, which may be an example of the network 130 of FIG. 1. In some embodiments, the encrypted message may be received by a server (e.g., server 140 of FIG. 1), which may receive and decode the message by one or more processes, as described in more detail, above (e.g., operation 216). For example, the encrypted message may be encrypted by symmetric encryption, and the server may decode the encrypted message using the same key used to encrypt it by the network request and message encoding process.

Following decoding, the server may implement one or more remote action determination processes (e.g., operation 218), whereby the server processes file and classifier information to determine a remote action. The remote action can be an example of the command, described in more detail above, and determination of the remote action by the remote action determination process may include the techniques described above (e.g., classification techniques including AI models, procedures, object-models, etc.). For example, when the information collected by the fingerprint module 210 and the user and file information gathered by the network request formation process indicate the file open request 204 should be authorized (e.g., the encrypted file should be decrypted), the server may determine a file opening remote action (e.g., operation 220). The file opening remote action may be packaged into a payload, as described above, by a server-side network request message encoding process (e.g., operation 222). The server may send the payload to the client-based application via the network 214.

As described above, the client-based application may decode and execute the payload (e.g., operation 224). Decoding may be implemented using a decryption key included in the payload. The client-based application may implement one or more kernel mode processes to decode and execute the payload. In reference to the file opening remote action, executing the payload may include sending a command to the file system of the computer system to decrypt the encrypted electronic file. As such, the computer system may implement a data decryption process (e.g., operation 226), which may include opening file data by decrypting file data in RAM using a server-supplied key (e.g., key 144 of FIG. 1). The data decryption process may initiate a read operation (e.g., operation 228) that may include interacting with the file system such that the data included in the encrypted electronic file can be available to the application originating the file open request 204. Data decryption processes and read operation processes may be included in the visible processes 202 that the user of the computer system is aware of or can identify as taking place (e.g., a requested file is opened while data is decrypted and/or read, a load image is presented on a display, etc.).

Figure 3:
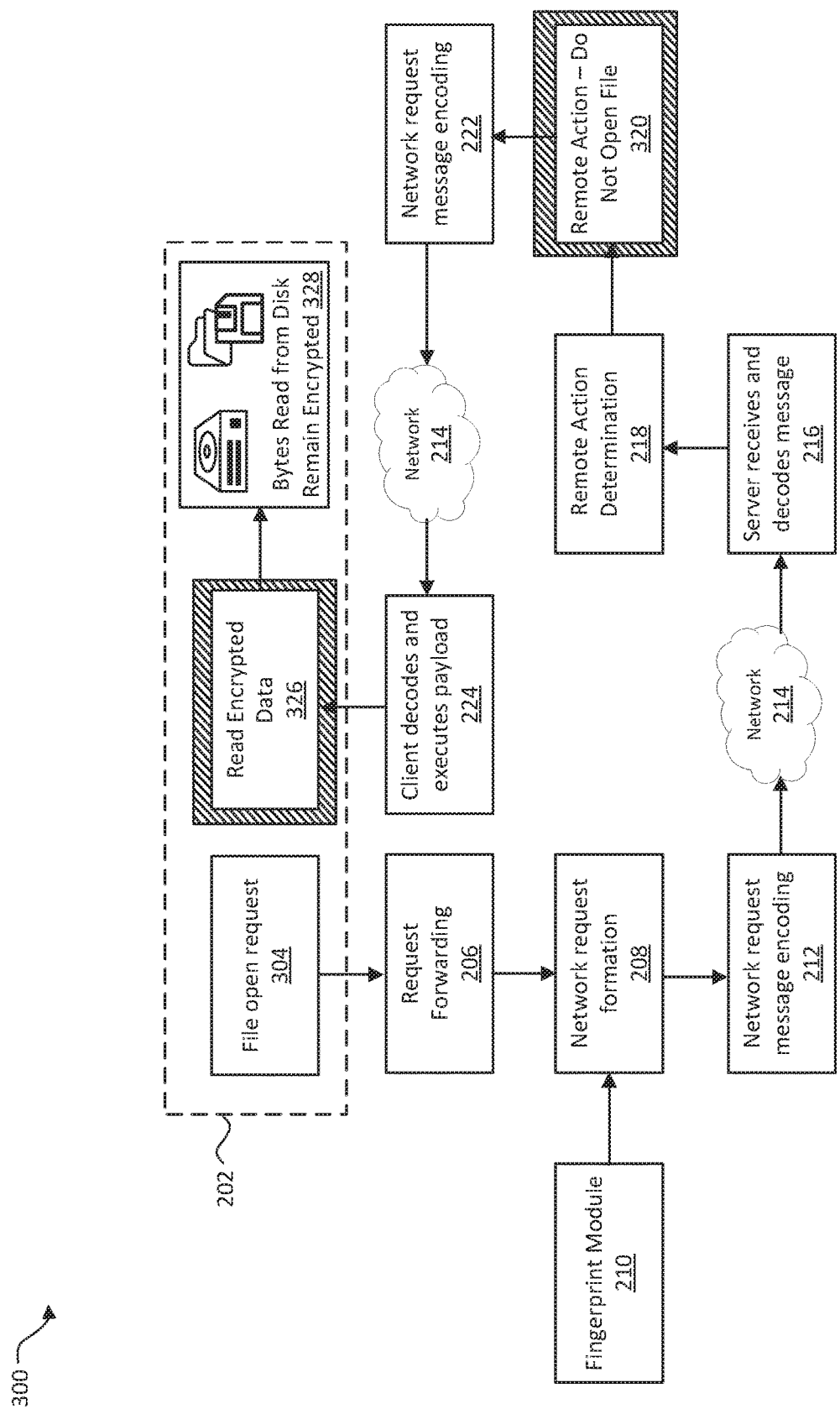
FIG. 3 illustrates an example technique for securely not opening a file, according to an embodiment of the present disclosure.

FIG. 3 illustrates an example technique 300 for securely not opening a file, according to an embodiment of the present disclosure. Similarly to the processes described in reference to the file open request, above (e.g., file open request 204 of FIG. 2) the example technique 300, by which a client-based application (e.g., client-based application 108 of FIG. 1) intercepts and inhibits decryption of an encrypted electronic file, may include visible processes 202 and one or more operations and/or processes executed in user mode and/or kernel mode. For example, a file open request 304 may be intercepted by the request forwarding process (e.g., operation 206), which may implement similar network request formation processes (e.g., operation 208) including classifier information gathered by the fingerprint module 210. The file open request 304 may then be encoded as a network request by one or more network request message encoding processes (e.g., operation 212), and sent over the network 214 to the server (e.g., server 140 of FIG. 1), which may receive and decode the encrypted message (e.g., encrypted message 116 of FIG. 1) by one or more decryption processes (e.g., operation 216). The server may determine a remote action (e.g., a control) by similar or different remote action determination processes (e.g., operation 218), including, but not limited to, procedural decision making, implementing an object model, or by implementing a machine-learning model, as described in more detail, above.

In contrast to the example technique 200 of FIG. 2, the information gathered by the network request formation processes in the case of the file open request 304 may cause the server to determine that the client-based application should inhibit decryption of the encrypted electronic file subject to the file open request 304. In such cases, the server may define the remote action as a "do not open file" remote action (e.g., operation 320), which may include a command to inhibit decryption of the encrypted electronic file. Upon determining the remote action as a "do not open file" remote action, the server may package a command to inhibit decryption in a payload (e.g., payload 120 of FIG. 1) via the network request message encoding process (e.g., operation 222), and may send the payload via the network 214. Upon receipt, the client-based application decodes and executes the payload (e.g., operation 224). The command, encoded in the payload as part of the payload contents (e.g., payload contents 126 of FIG. 1), may cause the client-based application to inhibit decryption of the encrypted application file. As such, the client-based application may read the encrypted data from the disk (e.g., operation 326), while leaving the data encrypted, preventing the data from being accessed (e.g., in plain language in the case of a text document). In this way, the data remains encrypted on the disk (e.g., operation 328). In some embodiments, the command may cause the client-based application to delete the encrypted data, rather than leaving it on the disk.

FIG. 4 illustrates an example technique 400 for securely exfiltrating data from a file, according to an embodiment of the present disclosure. In some cases, as described above, the server may generate a command to exfiltrate data from the encrypted electronic file additionally and/or alternatively to decrypting the file. In contrast to the example techniques described in reference to decrypting and inhibiting decryption of the encrypted electronic file (e.g., example technique 100 of FIG. 1 and example technique 200 of FIG. 2, respectively), the example technique 400 may include operations to decrypt file data or inhibit decryption of file data.

In some embodiments, a file open request 402 may be addressed at an encrypted electronic file on a computer system (e.g., computer system 102 of FIG. 1) running a client-based application (e.g., client-based application 108 of FIG. 1) configured to implement the operations described above (e.g., in reference to example technique 200 of FIG. 2). The file open request 402 may be intercepted by the request forwarding process (e.g., operation 206), and forwarded to the network request formation process (e.g., operation 208), where the globally unique identifier of the encrypted electronic file can be combined with a user identifier (e.g., a username) and classifier information gathered by the fingerprint module 210. The message generated by the network request formation process may be encrypted and encoded into a network request (e.g., by the network request message encoding process), to be sent to a server (e.g., server 140 of FIG. 1) over the network 214. The server may receive and decode the message (e.g., by operation 216), and may implement a remote action determination process (e.g., operation 218).

The remote action determination process may determine that the client-based application should exfiltrate the file data from the encrypted electronic file. Exfiltration may describe a kernel mode (e.g., kernel mode 106 of FIG. 1) process whereby file data is extracted from an encrypted electronic file and transferred to another system (e.g., a second computer system, an external server, a local server, etc.). Exfiltration of file data may include additional operations including, but not limited to, message encoding, encryption, packaging with additional data, and steganographic encryption, as described in reference to the encrypted message 116 of FIG. 1 and the payload 120 of FIG. 1.

In some embodiments, the server may create a payload including a command to implement the remote action to exfiltrate file data by the client-based application (e.g., operation 420). The command may specify the data to exfiltrate in one or more ways including, but not limited to, the data for an entire encrypted electronic file, a specific subset of the file data contained in the encrypted electronic file, metadata associated with the encrypted electronic file, etc.

The remote action may be combined with an additional remote action, such as a visible process 202. For example, the payload created by the server may also include a command to decrypt the encrypted electronic file, inhibit decryption of the encrypted electronic file, and/or any of the other commands described above (e.g., attaching malware, send an email, etc.). As described above, the payload may be packaged into a network request by a network request message encoding process (e.g., operation 222), and may be sent to the computer system (e.g., computer system 102 of FIG. 1). The client-based application may implement decoding and execution processes to decrypt and execute the payload (e.g., operation 224), which may in turn facilitate the client-based application to implement the command (e.g., executing the remote action and/or the additional action). For example, the client-based application may execute a file data open process (e.g., operation 426) as a visible process 202, which may lead to the decrypted file data being read from data storage (e.g., from a hard disk or other memory device) via a file read process (e.g., operation 428). Executing the payload may also include a data exfiltration process (e.g., operation 430). The data exfiltration process may include reading the decrypted file data (e.g., operation 432) and/or other data from data storage, and sending the read data to the other system over a network 434, which may be the same as the network 214 or may be a different network.

Figure 5:
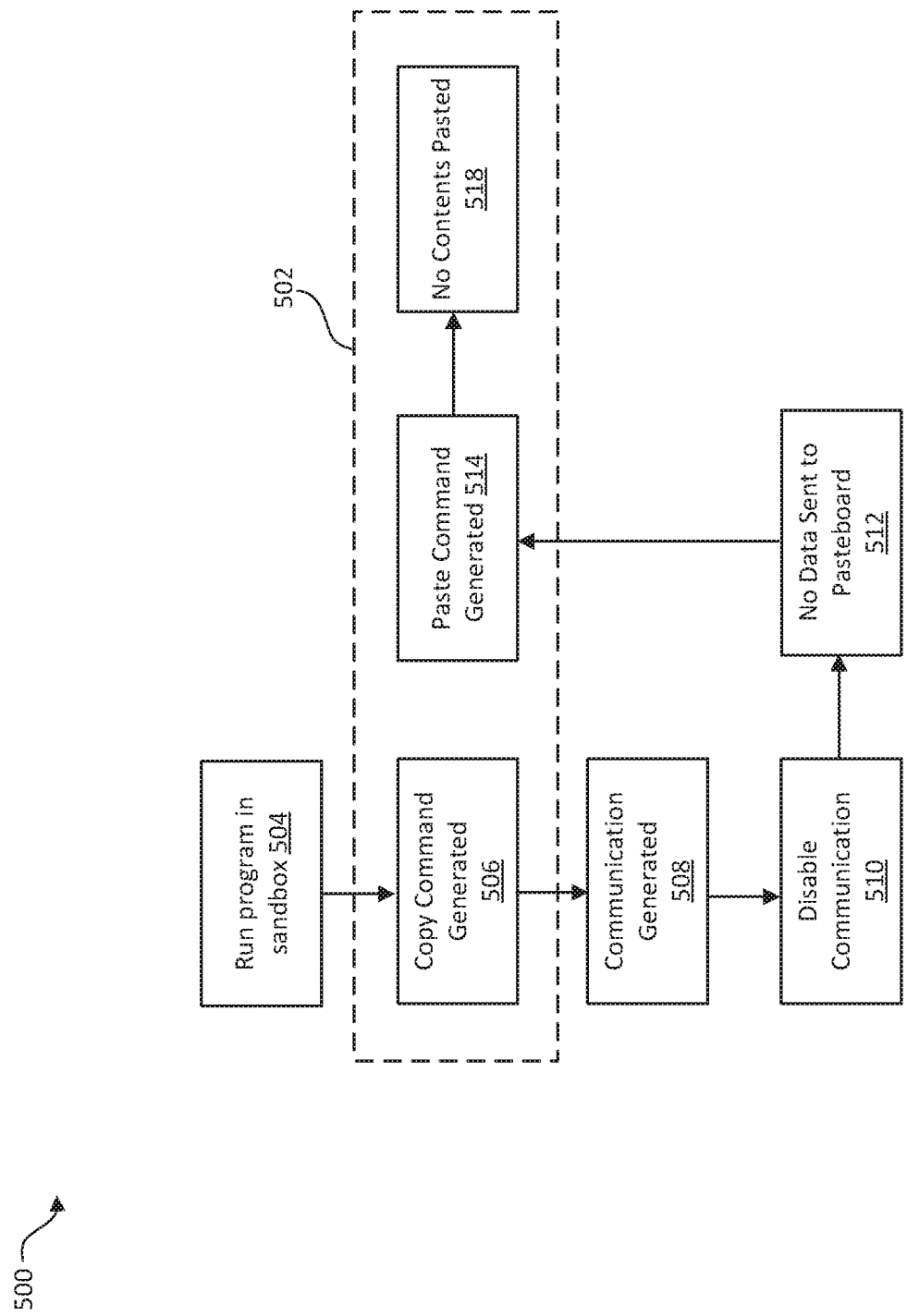
FIG. 5 illustrates an example technique for disabling user commands, according to an embodiment of the present disclosure.

FIG. 5 illustrates an example technique 500 for disabling user commands, according to an embodiment of the present disclosure. In addition to file access commands, other user mode (e.g., user mode 104 of FIG. 1) and/or kernel mode (e.g., kernel mode 106 of FIG. 1) processes may be intercepted, enabled, and/or disabled by a client-based application (e.g., client-based application 108 of FIG. 1). In some cases, native applications may permit a user to circumvent file controls, for example by creating temporary copies of portions of secured documents and transferring an unencrypted copy into an unsecured document created by the same native application (e.g., a copy-paste command sequence). In this way, an encrypted electronic file for which a file-level copy may be forbidden may be replicated in whole or in part, potentially without generating a file access request. To that end, the example technique 500 may introduce a sandbox within which the native application may be executed in a controlled manner, which may inhibit circumvention of file controls in some circumstances. As described above, some of the operations and processes described in the context of example technique 500 may be invisible to a user of the native application In some embodiments, the native application executes in a sandbox (e.g., operation 502) which may implement one or more controls on messages to processes and/or applications executing outside the sandbox. For example, the computer system (e.g., computer system 102 of FIG. 2) may include one or more is a computer programs that run as background processes, rather than being under the direct control of an interactive user (e.g., a daemon, service, started task, etc.). In some embodiments, as in the context of the example technique 500, the background process may include a "pasteboard" process that may be configured to facilitate copy and paste commands, for example, using a temporary storage utility (e.g., a "clipboard"). Executing the native application in the sandbox may include disabling access to the "pasteboard" process for the native application.

For example, a copy command may be generated (e.g., operation 506) as a user-initiated command in a native file-editing application (e.g., a document editor application, a file-browser application, etc.), which may be a visible process 502. The native application may generate a communication addressed to the "pasteboard" process, which may include text and/or object data from a secured document (e.g., operation 508). The client-based application implementing the sandbox may disable the communication (e.g., operation 510), for example, by controlling the kernel mode processes for which the native application is authorized (e.g., blocking all copy commands). As a result, the selected text and/or object data may be blocked from being sent to the "pasteboard" process, such that no data is sent (e.g., operation 512).

In some embodiments, as when the sandbox disables communication with one or more background processes, visible processes 502 (e.g., background processes) that would otherwise execute may be modified in their operation. For example, in the context of a copy-paste command sequence initiated by a user of the native application, a paste command may be generated (e.g., operation 514) to past the selected text, for which no data was sent to the "pasteboard" process. In some cases, the visible result of the paste command may include, but is not limited to, no data being pasted, or existing data from the temporary memory (e.g., the "clipboard") may be pasted, for example, the last data to be sent to the "pasteboard" process by an application running outside a sandbox.

Figure 6:
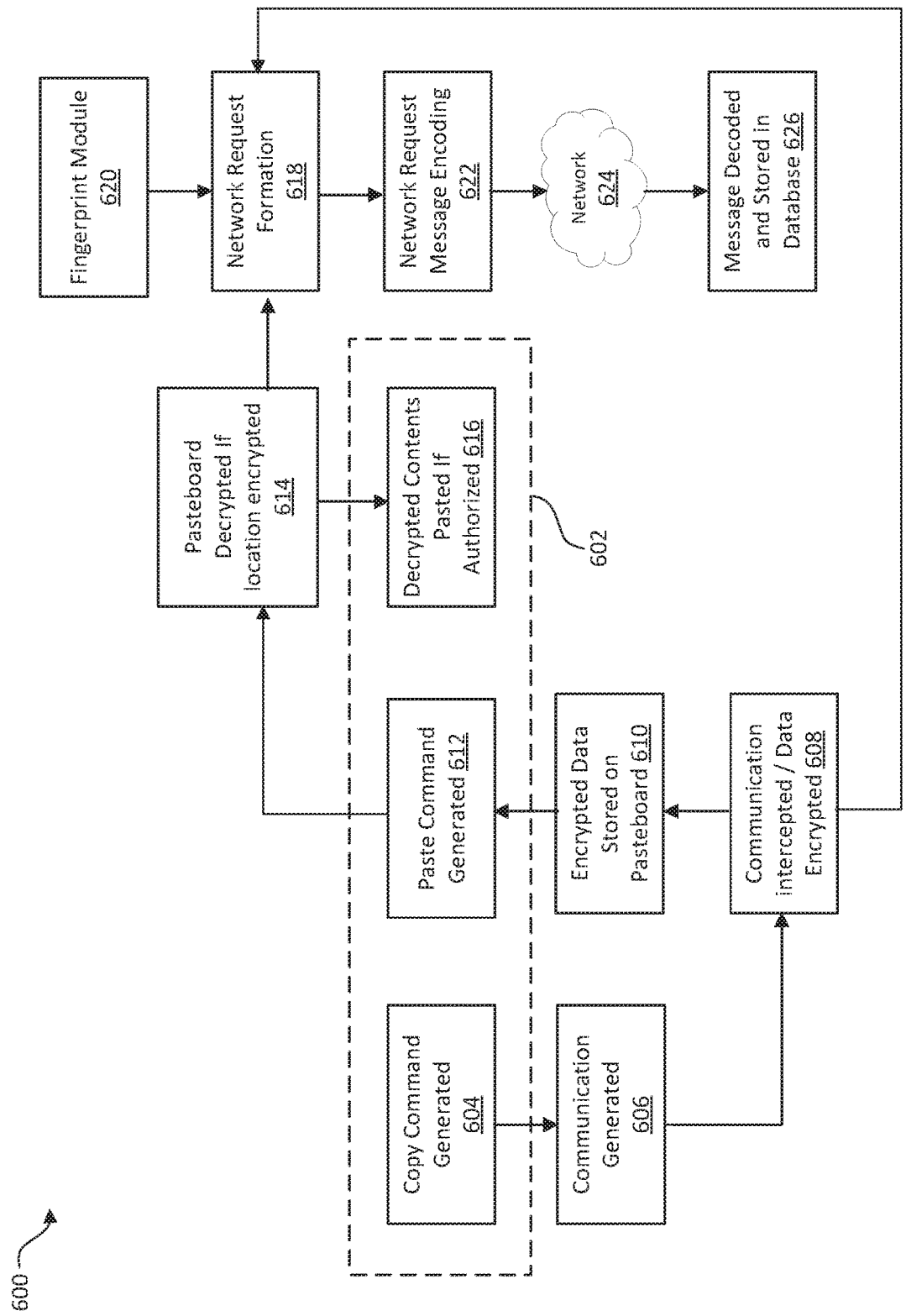
FIG. 6 illustrates an example technique for managing user commands in encrypted systems, according to an embodiment of the present disclosure.

FIG. 6 illustrates an example technique 600 for managing user commands in encrypted systems, according to an embodiment of the present disclosure. In some embodiments, background processes may be permitted that execute user-initiated commands and potentially circumvent file controls. In some cases, one or more processes of a client-based application (e.g., client based application 108 of FIG. 1) may intervene in the normal operation of such background process, implementing techniques described above in reference to file access requests. In this way, text and/or object data that could be sent from a secured file to an unsecured file (e.g., via the "pasteboard" process), may be intercepted and encrypted before it is sent to temporary memory (e.g., the "clipboard").

In some embodiments, one or more visible processes 602 may include a copy command being generated (e.g., operation 604). While a copy command is shown in example technique 600, additional and/or alternative commands may be included (e.g., select, edit, select-text, etc.). Following the copy command being generated, a background process may generate a communication (e.g., operation 606), which may be configured to send the selected text and/or object data to the "pasteboard" process. The communication may be intercepted, however, by the client-based application, which may also encrypt the text and/or object data (e.g., operation 608). Rather than implementing a sandbox, as described above, the client-based application may encrypt the text and/or object data, and may subsequently store, or release the encrypted data to be stored, (e.g., operation 610) in the temporary memory of the "pasteboard" process (e.g., the "clipboard"). In some embodiments, the text and/or object data may be encrypted by an encryption key supplied by a server (e.g., server 140 of FIG. 1) in communication with the client-based application. With the text and/or object data encrypted, a paste command (e.g., operation 612), for example, generated by the user of the computer system (e.g., computer system 102 of FIG. 1), may be intercepted by the client-based application (e.g., operation 614). The client-based application may ascertain whether the file addressed by the paste command is encrypted and/or otherwise secured by the client-based application, in which case the client-based application may decrypt the text and/or object data. Otherwise, the client-based application may leave the text and/or object data encrypted. In this way, the paste command may be executed (e.g., operation 616) such that decrypted contents may be pasted after the paste command is authorized, whereas encrypted contents may be pasted after the paste command is not authorized.

The client-based application may implement additional auditing operations to track and/or process use of copy-paste commands and other visible processes 602 that may potentially circumvent file controls. For example, for both communication interception processes (e.g., operation 608 and operation 614), the client-based application may formulate a network request (e.g., operation 618), analogously to the operations described in reference to FIG. 1. The network request may include information including, but not limited to file information (e.g., a globally unique identifier), classifier information, which may be gathered by a fingerprint module (e.g., operation 620). The classifier information may include the process information, system information, and user information described in more detail, above. In some embodiments, the network request message may be encoded and encrypted (e.g., operation 622) for transmission over a network 624 (e.g., an example of network 140 of FIG. 1). In some embodiments, as when the purpose of sending the network request message includes generating a database of auditing and/or tracking data, the network request message may be decoded and the file information and classifier information may be stored in the database (e.g., operation 626). In this way, a record of user-initiated operations may be kept as a potential approach to trace sources and/or origins of text and/or object data disseminated through circumvention of file controls.

Figure 7:
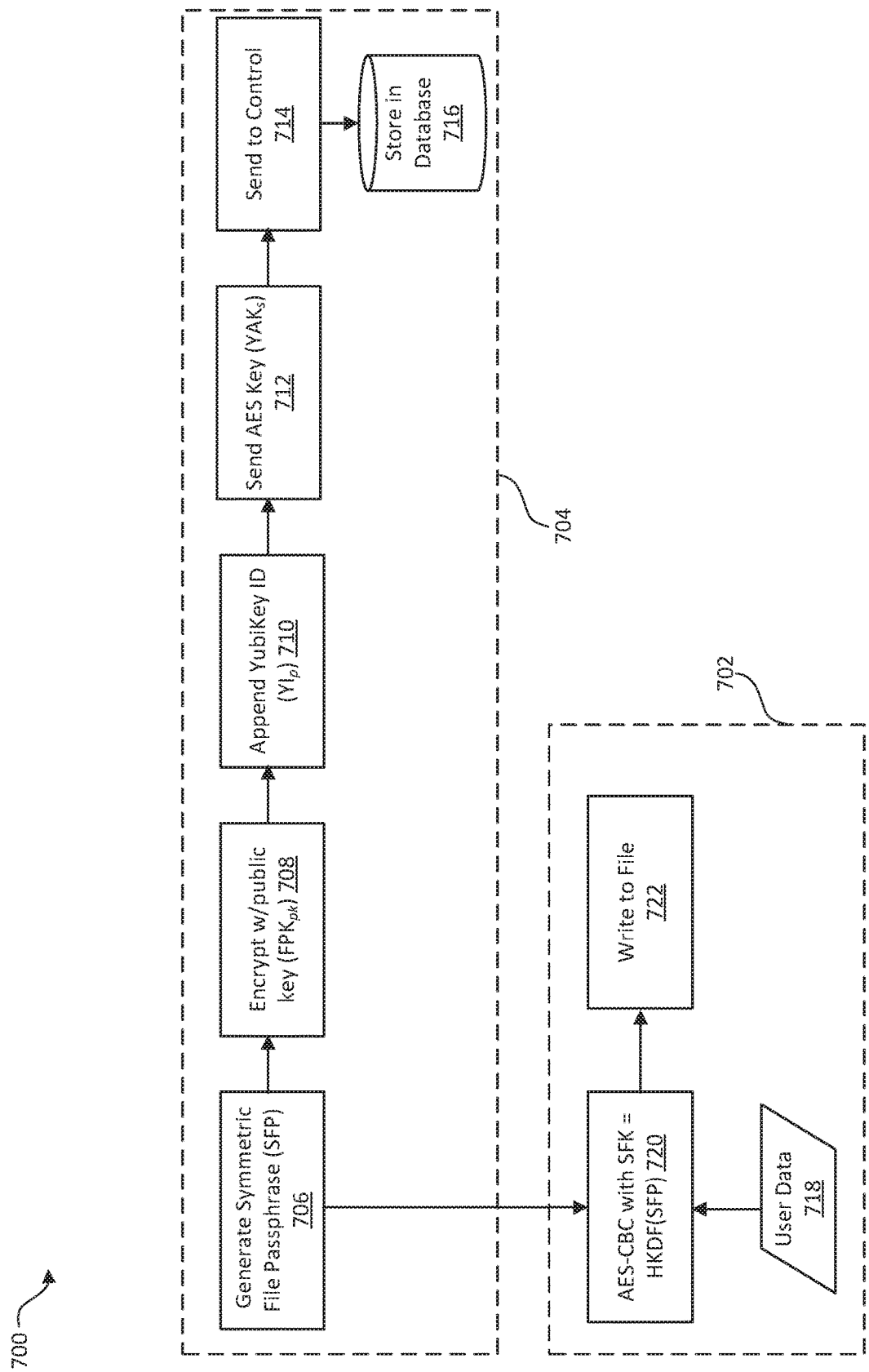
FIG. 7 illustrates an example technique for multi-factor encryption of user data, according to an embodiment of the present disclosure.

FIG. 7 illustrates an example technique 700 for multifactor encryption of user data, according to an embodiment of the present disclosure. As described above, a client-based application (e.g., client-based application 108 of FIG. 1) may be configured to intercept communications between a native application of a computer system (e.g., computer system 102 of FIG. 1) and a file system of the computer system (e.g., file system 110 of FIG. 1). In addition to intercepting the communication to send the communication to a server (e.g., server 140 of FIG. 1) for validation, the client-based application may be further configured to implement multi-factor encryption for file access control.

In some embodiments, file protection 702 operations may be supplemented by one or more network lock 704 operations. For example, network lock 704 operations may include generating a symmetric file passphrase (SFP) (e.g., operation 706). As described above, symmetric encryption may permit an encrypted electronic file to be decrypted using the same key as that used to encrypt the electronic file. In some cases, the SFP may be encrypted by asymmetric encryption with a public key of a public/private key pair ($FPK_{pk}$, $FPK_{sk}$, respectively) (e.g., operation 708).

Multifactor encryption may be facilitated by the inclusion of a hardware authentication device (e.g., a "YubiKey") configured to support single-use passwords, public-key cryptography and authentication. For example, a hardware authentication device identifier (e.g., a YubiKey ID—$YI_p$) may be appended to the encrypted SFP (e.g., operation 710), which may then be stored in temporary memory for the hardware authentication device (e.g., flash memory). In this way, a file-specific one-time use encryption key ($YAK_s$) (e.g., an Advanced Encryption Standard (AES) key) may be prepared for use at the time access to the encrypted electronic file is sought by a user. To facilitate tracking and/or control of the use of the $YAK_s$, the key may be sent to a control server (e.g., operation 714), which may be an example of the server 140 of FIG. 1, and may be stored in a database of keys (e.g., table 144 of FIG. 1) associated with secured electronic files (e.g., operation 716).

As part of the file protection operations 702, user data 718 may be encrypted using one or more encryption techniques (e.g., operation 720). For example, a combination of encryption techniques may include AES with cipher block chaining (CBC) (e.g., AES-CBC), described by a plain-text encryption technique employing chained text encryption with logical operations (e.g., XOR) applied to a plaintext block paired with a ciphertext block. As part of operation 720, the resulting ciphertext may be encrypted by a symmetric file key (SFK). In some cases, the SFK may be generated by applying a hash-based key derivation function (HKDF) to the SFP, generated in operation 706. The user data 718, thus encrypted, may be written to a secure electronic file (e.g., operation 722).

In cases where multifactor encryption is implemented to secure an electronic file (e.g., as in operation 720), access to the encrypted file may include additional operations to those described in reference to FIG. 1, above. For example, the hardware authentication device corresponding to the $YI_p$ may be requested by the client-based application prior to approving decryption of the encrypted electronic file. Additionally, the AES key ($YAK_s$) may be removed from the hardware authentication device following decryption, such that one or more network lock 704 operations may be repeated, and the electronic file may be encrypted using a different HKDF(SFP) in a second iteration of operation 720.

Figure 8:
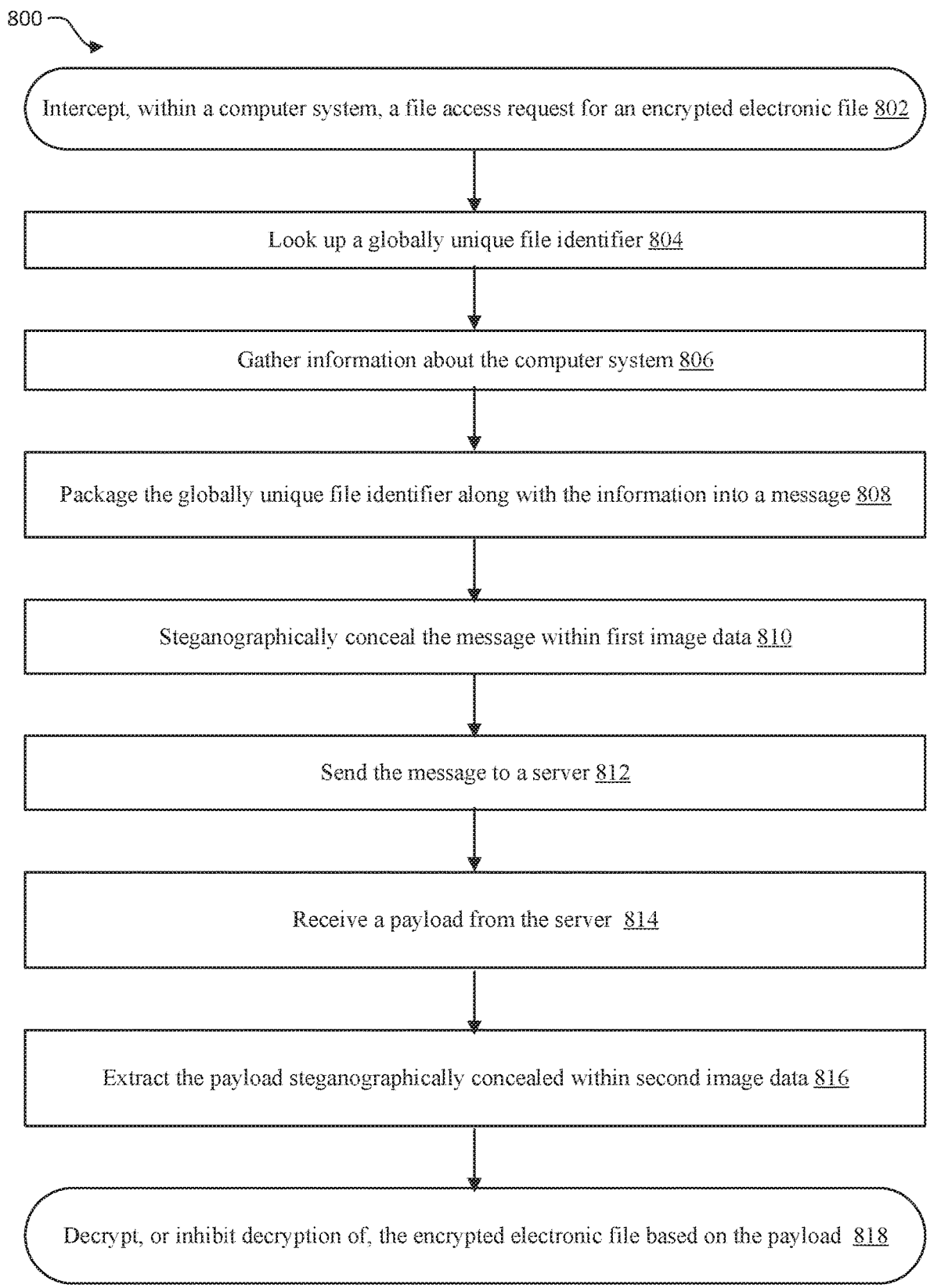
FIG. 8 illustrates an example flow for securing electronic files, according to embodiments of the present disclosure.
Figure 9:
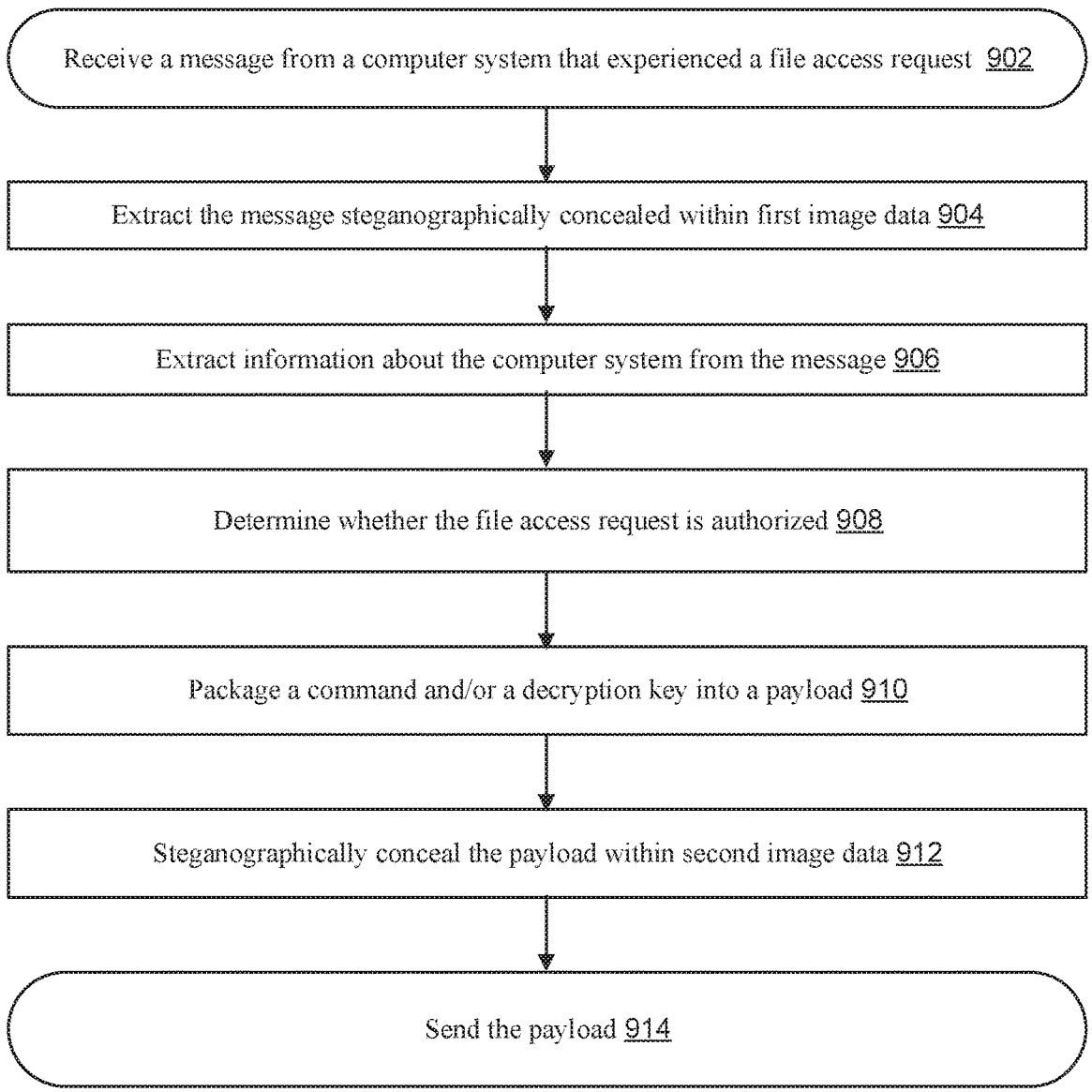
FIG. 9 illustrates an example flow for securing electronic files from a server, according to embodiments of the present disclosure.

FIGS. 8-9 illustrate example flows, according to embodiments of the present disclosure. The operations of the flow can be implemented as hardware circuitry and/or stored as computer-readable instructions on a non-transitory computer-readable medium of a computer system, such as the computer system 102 and/or the server 140 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 8 illustrates an example flow 800 for securing electronic files, according to embodiments of the present disclosure. In an example, the flow 800 includes an operation 802, where the computer system intercepts, within the computer system (e.g., computer system 102 of FIG. 1), a file access request (e.g., file open request 304 of FIG. 3) for an encrypted electronic file. As described above, a client-based application (e.g., client-based application 108 of FIG. 1) may detect and intercept the file access request, for example, when the file access request is a file-open request (e.g., file open request 204 of FIG. 2) addressed at the encrypted electronic file. Intercepting the file access request may include preventing the file access request from implementing one or more kernel mode (e.g., kernel mode 106 of FIG. 1) processes associated with file access operations.

In an example, the flow 800 includes an operation 804, where the computer system looks up a globally unique file identifier. The globally unique file identifier may be associated with the encrypted electronic file in a file system (e.g., file system 110 of FIG. 1) that may manage files stored in memory of the computer system. The computer system may receive the globally unique file identifier from the file system.

In an example, the flow 800 includes an operation 806, where the computer system gathers information about the computer system. One or more user mode (e.g., user mode 104 of FIG. 1) and or kernel mode processes may gather information (e.g., information 111 of FIG. 1) about the computer system that may include, but is not limited to, process information, system information, and/or user information, as described in more detail in reference to FIG. 1, above. In some embodiments, the information may be gathered by a fingerprint module (e.g., fingerprint module 210 of FIG. 2) of the client-based application.

In an example, the flow 800 includes an operation 808, where the computer system packages the globally unique file identifier along with the information into a message (e.g., encrypted message 116 of FIG. 1). Packaging the message can include forming a network request (e.g., network request formation 208 process of FIG. 2), which may be encrypted in one or more ways (e.g., network request message encoding 212 process of FIG. 2), as described in more detail in reference to FIG. 1, above.

Optionally, the flow 800 may include an operation 810, where the computer system steganographically conceals the message within first image data (e.g., first image 132 of FIG. 1). Steganography may permit additional concealment of encrypted messages within images sent between the computer system and the server. For example, when encrypted messages are steganographically concealed, images sent over a network (e.g., network 130 of FIG. 1) may appear to contain images, rather than encrypted messages, which may potentially improve the security of messages sent by the computer system.

In an example, the flow 800 includes an operation 812, where the computer system sends the message to the server. Sending the message, as described in more detail in reference to FIGS. 1-2, may include sending using a kernel mode process over the network. In some embodiments, for example, when the server and the computer system are part of the same physical computer system, sending the message may include communicating over a private network (e.g., an encrypted network, a local area network, etc.), rather than a public network (e.g., the internet).

In an example, the flow 800 includes an operation 814, where the computer system receives a payload (e.g., payload 120 of FIG. 1) from the server. The payload may include one or more commands, as well as additional information including, but not limited to, a symmetric encryption key (e.g., encryption key 118 of FIG. 1). The payload may be received via the same network over which the computer system sent the encrypted message (e.g., network 130 of FIG. 1).

Optionally, the flow 800 may include an operation 816, where the computer system extracts the payload steganographically concealed within second image data. Similarly to the benefits of steganographically concealing the encrypted message in a first image, for example, to potentially mask the nature of message traffic, the payload may also be concealed in a second image file (e.g., second image file 134 of FIG. 1). In some embodiments, the second image file and the first image file may be the same file.

In an example, the flow 800 includes an operation 818, where the computer system decrypts, or inhibits decryption of, the encrypted electronic file based on the payload. The computer system may extract the command from the payload contents (e.g., payload contents 126 of FIG. 1). The command may cause the client-based application to decrypt the encrypted electronic file subject to the file access request (e.g., data decryption 226 process of FIG. 2) or to inhibit encryption of the encrypted electronic file (e.g., read encrypted data 326 process of FIG. 3).

FIG. 9 illustrates an example flow 900 for securing electronic files from a server, according to embodiments of the present disclosure. In an example, the flow 900 includes an operation 902, where the computer system (e.g., server 140 of FIG. 1) receives a message (e.g., encrypted message 116 of FIG. 1) from a computer system that experienced a file access request (e.g., computer system 102 of FIG. 1). The computer system, may be configured to communicate with the computer system that experienced a file access request, and to receive the message, over a network (e.g., network 130 of FIG. 1).

Optionally, the flow 900 may include an operation 904, where the computer system extracts the message steganographically concealed within first image data. In some embodiments, the message may be concealed in a first image (e.g., first image file 132 of FIG. 1) by steganography. Steganography may potentially improve integrity of inter-system communications, for example, by masking the message to make it appear to external observers as the first image.

In an example, the flow 900 includes an operation 906, where the computer system extracts information (e.g., information 111 of FIG. 1) about the computer system from the message. Extracting the information about the computer system may include one or more decryption steps, for example, symmetric decryption. In some embodiments, symmetric decryption may include decrypting the message using a server-generated symmetric key (e.g., key 118 of FIG. 1).

In an example, the flow 900 includes an operation 908, where the computer system determines whether the file access request is authorized. Determining may include implementing a decision engine (e.g., AI engine 142 of FIG. 1) by one or more operations (e.g., remote action determination process 218 of FIG. 2). The operations may include procedures (e.g., imperative responses to specified information), rules (e.g., multi-parametric models), and/or artificially intelligent systems (e.g., clustering algorithm including unsupervised learning models implemented in an artificial neural network).

In an example, the flow 900 includes an operation 910, where the computer system packages a command and/or a decryption key into a payload (e.g., payload 120 of FIG. 1). Packaging the payload (e.g., file opening remote action 220 process of FIG. 2) may include encrypting the payload (e.g., symmetric encryption, asymmetric encryption) using an encryption key (e.g., key 144 of FIG. 1). In cases where symmetric encryption is used to decrypt the payload, the encryption key may be included as part of the data packaged into the payload. The payload may also include additional commands, requests for system information to be gathered by the system, requests for additional information to be provided by the user, etc.

Optionally, the flow 900 may include an operation 912, where the computer system steganographically conceals the payload within second image data. The payload, like the message, may be concealed within a second image (second image file 134 of FIG. 1). In some embodiments, the second image may be the same image as the first image.

In an example, the flow 900 includes an operation 914, where the computer system sends the payload. The computer system may send the payload (e.g., network request message encoding 222 process of FIG. 2) over the network (e.g., network 130 of FIG. 2), which may be the same network over which the message was received.

Figure 10:
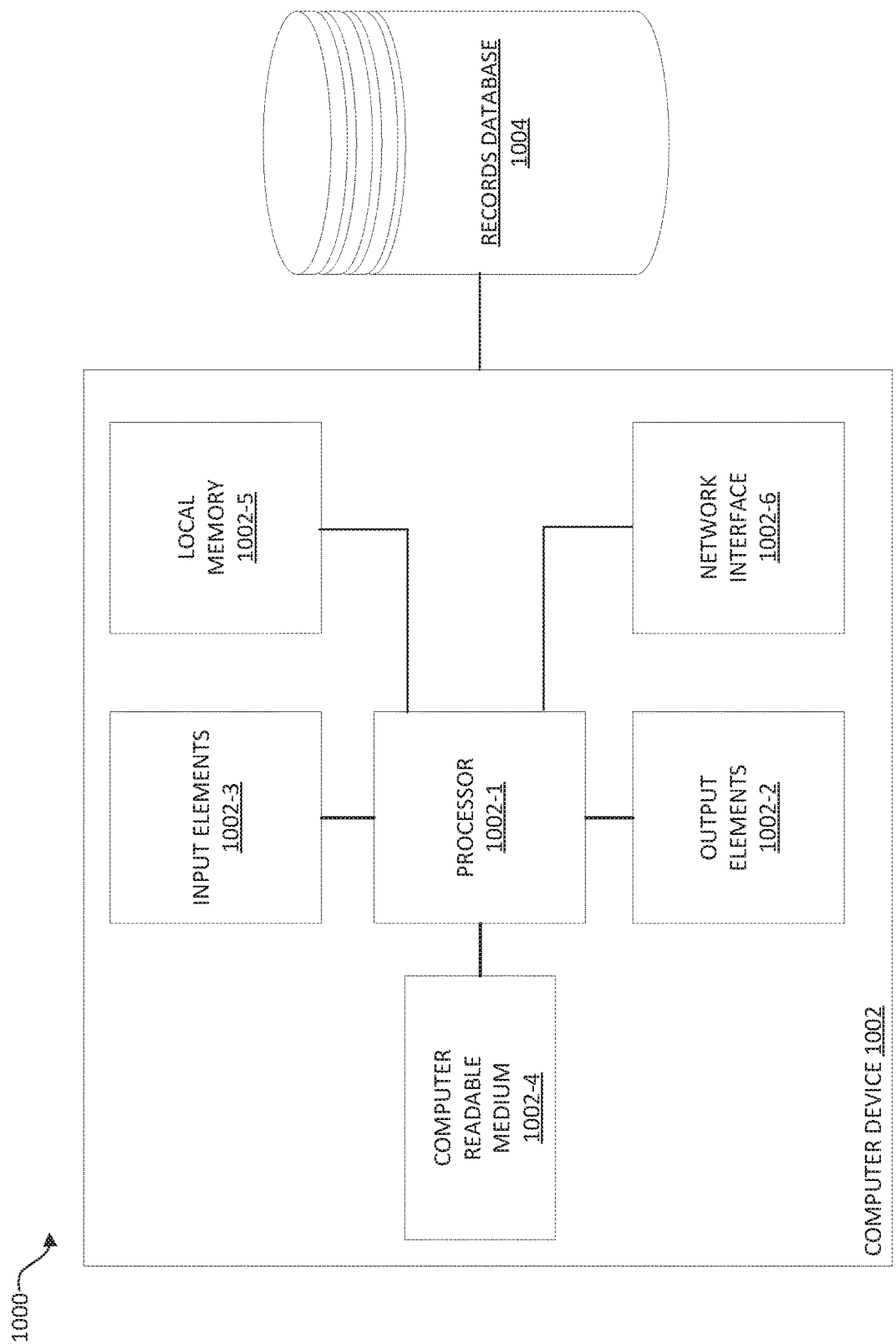
FIG. 10 illustrates an example of a hardware system suitable for implementing a computer system, according to embodiments of the present disclosure.

FIG. 10 shows a block diagram of a system 1000 comprising a number of components according to some embodiments of the invention. The system comprises a computer device 1002 in communication with a records database 1004. The records database 1004 may store a plurality of records and data associated with each one of the plurality of records. According to various embodiments, the records database 1004 may be at a remote location compared to the computer device 1002. The exemplary computer device 1002 may comprise, but is not limited to, a processor 1002-1, an output element 1002-2, an input element 1002-3, a computer readable medium 1002-4, a local memory 1002-5, and a network interface 1002-6.

The output element 1002-2 may comprise any suitable devices that may output data. Examples of output elements 1002-2 may include display screens, speakers, data transmission devices, printing devices, etc. The input element 1002-3 may include any suitable device capable of inputting data into the computer device 1002. Examples of input devices include mouse, keyboard, stylus pens, buttons, touchscreens, touch pads, microphones, etc. The local memory 1002-5 may store data saved thereon. For example, the local memory may store the cached parent/child data information described above. The network interface 1002-6 may include an interface that can allow the access device 1002 to communicate with external computers or databases, such as the records database 1004.

The computer readable medium 1002-4 may comprise code, executable by the processor 1002-1, to implement a method comprising: intercepting, within the computer device 1002, a file access request for an encrypted electronic file having a filename; looking up a globally unique file identifier associated with the filename; gathering, from within the computer device 1002, information about the computer device 1002, the information including a name of a process that sent the file access request and a username running the process; packaging the globally unique file identifier along with the information into a message; sending the message from the computer device 1002 to a server; receiving a payload from the server in response to the sent message; and decrypting, or inhibiting decryption of, the encrypted electronic file based on the payload.

Alternatively, the computer readable medium 1002-4 may comprise code, executable by the processor 1002-1, to implement a method comprising: receiving, at the computer device 1002, a message from a computer system that experienced a file access request for an encrypted electronic file; extracting information about the computer system from the message, the information including a name of a process that sent the file access request and username running the process; determining, at the computer device 1002, whether the file access request is authorized, conditionally authorized, or not authorized based on the information; packaging a command and/or a decryption key into a payload based on the determining; and sending the payload from the computer device 1002 to the computer system.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or processing server computer.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method of securing electronic files, the method comprising:
   intercepting, within a computer system, a file access request for an encrypted electronic file;
   looking up a globally unique file identifier associated with the encrypted electronic file;
   gathering, from within the computer system, information about the computer system, the information including a name of a process that sent the file access request and a username running the process;
   packaging the globally unique file identifier along with the information into a message;
   sending the message from the computer system to a server;
   receiving a payload from the server in response to the sent message; and
   decrypting, or inhibiting decryption of, the encrypted electronic file based on the payload.

2. The method of claim 1 further comprising:
   steganographically concealing the message within first image data before the sending; and
   extracting the payload steganographically concealed within second image data received from the server.

3. The method of claim 2 wherein the first image data and the second image data correspond to a single image.

4. The method of claim 1 wherein the packaging of the message includes encrypting using a Signal Protocol.

5. The method of claim 1 wherein the payload includes a decryption key.

6. The method of claim 1 wherein the payload includes a command from the server.

7. The method of claim 6 further comprising:
gathering additional information about the computer system per the command;
packaging the additional information into an exfiltration message; and
sending the exfiltration message from the computer system to the server.

8. The method of claim 6 further comprising:
prompting a user of the computer system for additional information per the command;
packaging a response to the user prompt into an additional message;
sending the additional message from the computer system to the server; and
receiving a second payload from the server in response to the sent additional message.

9. The method of claim 6 further comprising:
providing, per the command, a different file from that requested by the file access request.

10. The method of claim 6 further comprising:
attaching malware to the encrypted electronic file per the command.

11. The method of claim 6 further comprising:
deleting the encrypted electronic file per the command.

12. The method of claim 1 wherein the inhibiting of decryption includes bypassing a decryption routine, providing an incorrect decryption key to the decryption routine, or canceling the decryption routine.

13. The method of claim 1 wherein the information about the computer system further includes:
a process identifier (PID) of the process;
a name of an application associated with the process
a path of an executable associated with the process;
an uptime of the process;
a central processing unit (CPU) usage of the process;
a memory usage by the process; and/or
a hash of the executable associated with the process.

14. The method of claim 1 wherein the information about the computer system further includes:
a shell type running the process;
a time logged in of the username;
whether the username is logged in locally or remote;
whether there exists a printer redirection for the username;
whether there exists a clipboard redirection for the username;
a group membership of the username;
sudo permissions for the username;
a user database associated with the username; and/or
a password hash associated with the username.

15. The method of claim 1 wherein the information about the computer system further includes:
an internet protocol (IP) address;
a serial number;
a media access control (MAC) address;
a trusted platform module (TPM) key;
an operating system (OS) version;
a time zone setting;
a local language setting;
a list of hardware drivers connected with the computer system;
a list of software versions;
a list of installed software;
a list of networks connected;
a link-layer protocol; and/or
a link-layer detail.

16. The method of claim 1 further comprising:
receiving, before the intercepting, an email with the encrypted electronic file from a second computer system in which decryption of the encrypted electronic file was previously inhibited at the second computer system.

17. The method of claim 1 further comprising:
attaching, after the inhibiting of decryption, the encrypted electronic file to an email; and
sending the email from the computer system to a second computer system, wherein an encryption key is successfully provided to the second computer system from the server based on a second message with the globally unique file identifier along with a name of a process from the second computer system and a username from the second computer system.

18. The method of claim 1 wherein the intercepting is performed by a kernel extension, a system extension, or a usermode process.

19. The method of claim 1 wherein the file access request includes an open request, a read request, a write request, or a permission change request.

20. A machine-readable non-transitory medium embodying information for securing electronic files, the information indicative of instructions for causing one or more machines to perform operations comprising:
intercepting, within a computer system, a file access request for an encrypted electronic file;
looking up a globally unique file identifier associated with the encrypted electronic file;
gathering, from within the computer system, information about the computer system, the information including a name of a process that sent the file access request and a username running the process;
packaging the globally unique file identifier along with the information into a message;
sending the message from the computer system to a server;
receiving a payload from the server in response to the sent message; and
decrypting, or inhibiting decryption of, the encrypted electronic file based on the payload.

21. A computer executing program code for securing electronic files, the computer comprising:
a memory; and
at least one processor operatively coupled with the memory and executing program code from the memory comprising instructions for:
intercepting, within a computer system, a file access request for an encrypted electronic file;
looking up a globally unique file identifier associated with the encrypted electronic file;
gathering, from within the computer system, information about the computer system, the information including a name of a process that sent the file access request and a username running the process;
packaging the globally unique file identifier along with the information into a message;
sending the message from the computer system to a server;
receiving a payload from the server in response to the sent message; and
decrypting, or inhibiting decryption of, the encrypted electronic file based on the payload.

* * * * *